United States Patent

Mori et al.

[11] Patent Number: 5,325,004
[45] Date of Patent: Jun. 28, 1994

[54] MOTOR

[75] Inventors: Yoichi Mori; Hiroyuki Yonei, both of Shiga; Takashi Yokoyama, Yokaichi; Kiyoharu Noguchi, Naka, all of Japan

[73] Assignee: Nippon Densen Corporation, Kyoto, Japan

[21] Appl. No.: 883,644

[22] Filed: May 15, 1992

[30] Foreign Application Priority Data

May 16, 1991 [JP] Japan .................. 3-141176
May 28, 1991 [JP] Japan .................. 3-154073
Sep. 2, 1991 [JP] Japan .................. 3-250486

[51] Int. Cl.⁵ .............. H02K 7/14; G11B 17/02; G11B 17/08
[52] U.S. Cl. .............. 310/67 R; 360/98.07; 360/99.08
[58] Field of Search .......... 310/67 R, 90, 156; 360/98.07, 97.02, 99.04, 99.08

[56] References Cited

U.S. PATENT DOCUMENTS

| | | | |
|---|---|---|---|
| 4,814,652 | 3/1989 | Wright | 310/67 R |
| 4,843,500 | 6/1989 | Elsässer et al. | 310/156 |
| 4,905,110 | 2/1990 | Krum et al. | 310/156 |
| 5,001,581 | 3/1991 | Elsässer et al. | 360/97.02 |
| 5,061,868 | 10/1991 | Iwazaki et al. | 310/67 R |
| 5,160,865 | 11/1992 | Gururangan | 310/67 R |
| 5,179,483 | 1/1993 | Lowe | 360/97.02 |

FOREIGN PATENT DOCUMENTS

| | | | |
|---|---|---|---|
| 0136985 | 7/1985 | Japan | 360/97.02 |
| 0056896 | 3/1988 | Japan | 360/97.02 |

Primary Examiner—Steven L. Stephan
Assistant Examiner—C. LaBalle
Attorney, Agent, or Firm—McCormick, Paulding & Huber

[57] ABSTRACT

A spindle motor includes a housing, a shaft member fixed in the housing, a rotor rotatably supported on the shaft member, a rotor magnet mounted on the rotor, and a stator placed facing with the rotor magnet. The housing and the shaft member are made of materials different in hardness and a sleeve having substantially the same level of hardness as the shaft member is placed between the housing and the shaft member. A bushing is provided between bearing members and the rotor which is rotatably supported by the bearing members. The bushing and a yoke which is mounted on the rotor are secured together in the axial middle part of the bushing. In addition, through holes which enable communications between the interior and exterior area of the motor are provided in the bushing.

9 Claims, 4 Drawing Sheets

MOTOR

BACKGROUND OF THE INVENTION

1. Field of the Invention

The present invention relates to a motor and more particularly to a spindle motor which drives recording disks.

2. Description of the Related Art

A spindle motor, as an example of a motor in general, includes a housing, a shaft member fixed in the housing, and a hub (which functions as a rotor) rotatably supported on the shaft member through a bearing means. A rotor magnet is provided on the inner circumferential surface of the hub and a yoke is provided facing with the rotor magnet. Thus, the recording disks such as magnetic disks can be mounted on the hub in a desired manner.

In the spindle motor of this kind, when the shaft member is made of stainless steel and the housing is made of aluminum, for example, the following shortcomings are produced. Namely, when the shaft member is fixed in the housing by a press fitting, the inner circumferential surface of the supporting hole of the housing for the shaft member will be damaged by the shaft with a high possibility due to the difference in hardness of the materials between the shaft member and the housing. When the inner circumferential surface of the supporting hole is damaged, a fitting accuracy between the shaft member and the housing will become worse, then the rotational accuracy of the hub will fall, which will cause a deflection of the recording disks.

In addition, there exists a sort of the spindle motor which has a hub rotatably supported through a pair of bearing means and has a bushing placed between the one part of the pair of bearing means and the yoke mounted on the inner circumferential surface of the hub. Generally, the hub is made of aluminum and the yoke member is made of iron. When the hub and the yoke are secured together by such means as a shrink fitting over the relatively long span in their axial direction, thermal stress can be generated due to the difference in thermal expansion between the hub and the yoke. In addition, when the bushing made of the same iron as the material of joke is inserted into the yoke by a press fitting in substantially overall span of the bushing, the thermal stress will be also generated between the yoke and the bushing member. Then, in fitting area between the bushing member and the yoke, a clearance will be created and this clearance may cause an eccentricity in the rotation center of the hub.

Furthermore, there also exists a sort of the spindle motor which has a hub rotatably supported through bearing means at both ends of the hub and has a magnetic fluid seal means provided on the outer area of the bearing means. In this type of the motor, by means of this magnetic fluid seal means, an interior area of the motor can be sealed almost completely from an exterior area to prevent lubricant particles on the interior area of the motor from dispersing into the exterior area of the motor. Accordingly, the magnetic fluid seal means have been preferably employed into a field of such as a hard disk unit, where a disk room outside the motor must be maintained in clean condition. However, when there is a pressure difference exceeding a certain limit between the interior and exterior areas of the motor caused by a variation of temperature or atmospheric pressure, a magnetic fluid of the magnetic fluid seal means could be dispersed becoming intolerable to the pressure difference.

SUMMARY OF THE INVENTION

Accordingly, the first object of the present invention is to provide a motor in which a shaft member is press fitted into a housing with a high accuracy.

The second object of the present invention is to provide a motor in which a rotor and a yoke are fixed in a improved manner to minimize an eccentricity in a rotation center of the rotor, which is caused by a variation of temperature.

The third object of the present invention is to provide a motor in which a dispersion of a magnetic fluid of a magnetic fluid seal means, caused by a pressure difference between the interior and exterior areas of the motor, is withheld by a substantial cancellation of the pressure difference.

BRIEF DESCRIPTION OF THE DRAWINGS

Other objects and features of the invention will become apparent from the following description of illustrated embodiments when read in conjunction with the accompanying drawings.

DETAILED DESCRIPTION OF THE PREFERRED EMBODIMENTS

A detailed description of the invention will be given in conjunction with the accompanying drawings.

The First Embodiment

The first embodiment of a spindle motor as an example of a motor according to the present invention will be described with reference to FIGS. 1, 2-A, and 2-B.

Figure 1:
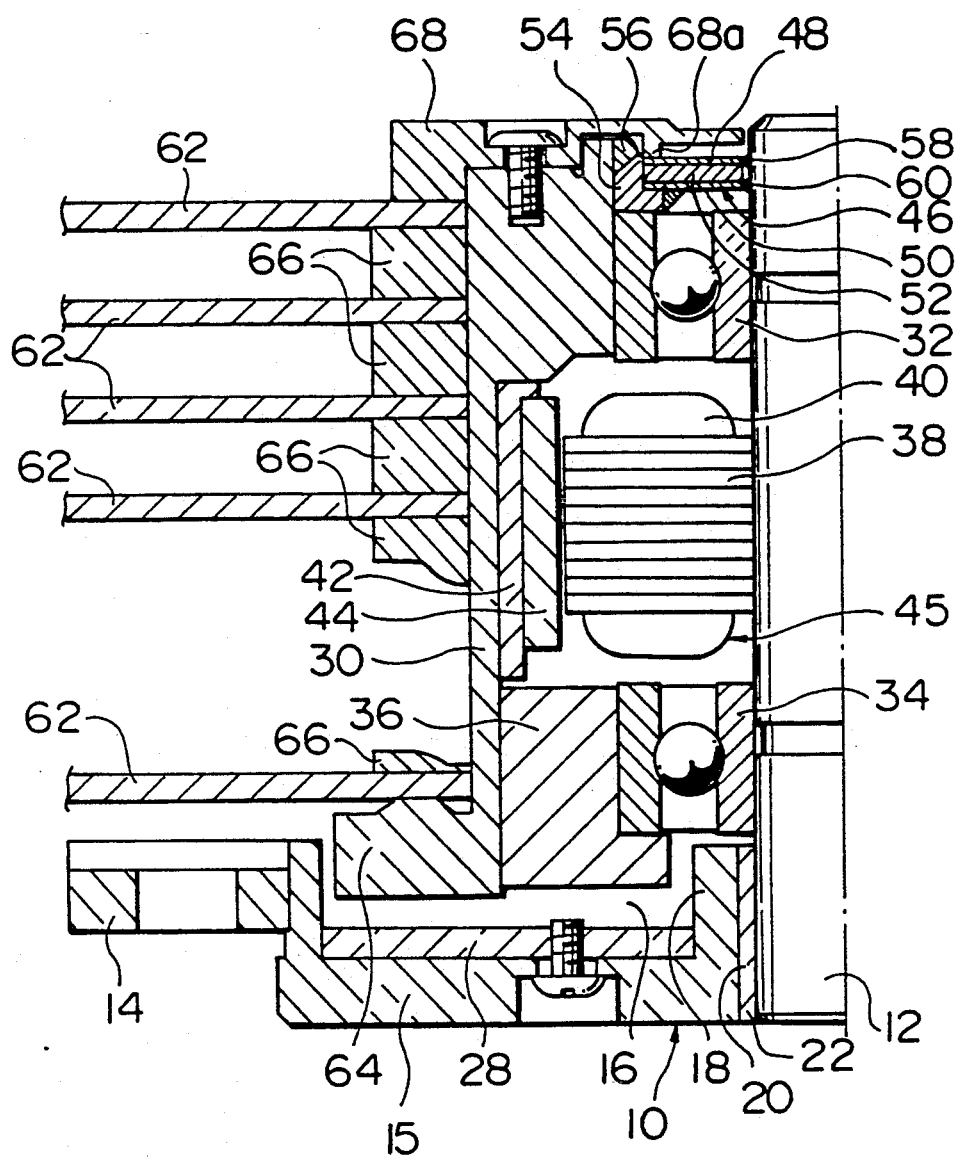
FIG. 1 is a section view illustrating an essential part of the first embodiment of a motor according to the present invention.
Figure 2A:
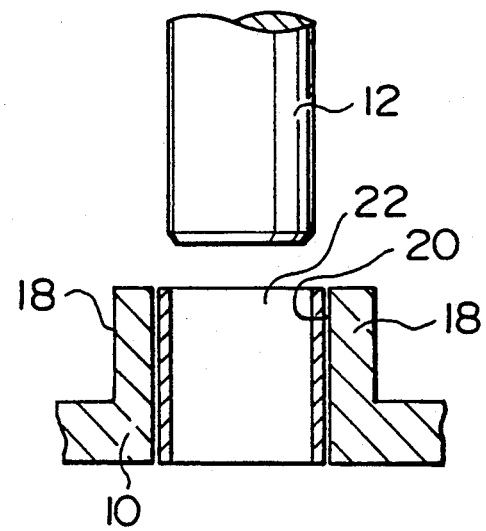
FIGS. 2-A and 2-B are a partially enlarged section view illustrating a manner of fixing a shaft member into a housing of the motor shown in FIG. 1.
Figure 2B:
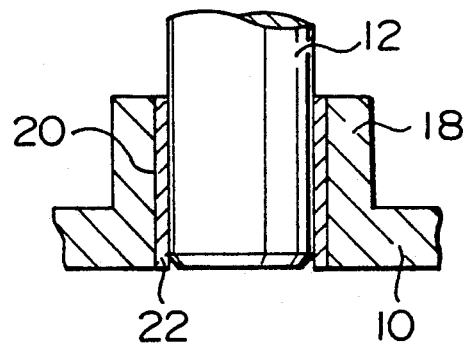

The spindle motor illustrated in FIG. 1 comprises a housing 10, a shaft member 12 secured to the housing 10, and a rotor 30 (which functions as a hub) rotatably supported on the shaft member 12. The housing 10 is made of aluminum or materials, softer in hardness, such as an aluminum alloy. In the outer circumferential area of the housing 10, a flange 10 which is mounted on a disk drive device (not shown in the FIGS). is provided. In a main part 15 of the housing 10, a recess 16 of which an opening is provided upwardly, as viewed in FIG. 1, is provided. In the center of the recess 16, an upwardly protruding cylindrical portion 18 is provided. Then, a through hole 20 which vertically runs through the housing 10 is formed in the protruding cylindrical portion 18. The shaft member 12 is made of rather hard materials such as ferromagnetic stainless steel. One end portion of the shaft member 12 is fixed in the protruding portion 18 of the housing 10 through a sleeve 22. In an embodiment of the present invention, the sleeve 22 is made of ferromagnetic stainless steel which is the same material as that of the shaft member 12. The inner diameter of the sleeve 22 is designed to be a little smaller than the outer diameter of one end portion of the shaft member 12 (the portion to be fixed in the protruding portion 18) so as to provide a tight fit between the sleeve 22 and the shaft member 12. On the other hand, the outer diameter of the sleeve 22 is designed to be a little smaller than the inner diameter of the through hole 20 so as to provide a clearance fit between the housing 10 and the sleeve 22. In the above described configuration, the sleeve 22 is fixed by a tight fit to one end portion of the shaft member 12. This tight fit enables both the inner and outer diameters of the sleeve 22 to be expanded to provide press fitting between the outer circumferential surface of the sleeve 22 and the inner circumferential surface of the through hole 20 of the housing 10, thus enabling these two circumferential surfaces to be secured together.

The manner of securing the shaft member 12 will be described in detail as follows: In the first place, to secure the shaft member 12 inside the through hole 20 of the housing 10 through the intermediary of the sleeve 22, the sleeve 22 should be inserted by a clearance fitting into the through hole 20 as shown in FIG. 2-A. Then, the shaft member 12 is inserted into the sleeve 22 by a press fitting to secure the sleeve 22 and the shaft member 12 together by a tight fitting, which causes the outer diameter of the sleeve 22 to expand to provide a press fitting between the sleeve 22 and the protruding portion 18 of the housing 10 to secure together as shown in FIG. 2-B. As the same materials are used for the shaft member 12 and the sleeve 20, the degree of hardness of both the materials should be the same. Accordingly, between the surfaces of shaft 12 and the sleeve 22, even if small scratched traces are produced by the press fit, the scratched traces will not develop into a galling which may affect the precision of fitting. On the other hand, between the surfaces of the sleeve 22 and the protruding portion 18, although the housing 10 has a hardness rather softer than that of the sleeve 22, there will be substantially no scratched traces, such as a galling, because the sleeve 22 will be securely press fitted into the through hole 20 of the protruding portion 18 due to an expansion of the outer diameter of the sleeve 22 which originally is fixed in the through hole 20 by a clearance fitting.

In the inside area of the main part 15 of the housing 10, an annular circuit substrate 28 is provided. The rotor 30, made of aluminum or an aluminum alloy, has one end (a bottom end) which is rotatably supported on the shaft member 12 through the intermediary of a ball bearing 34 and an annular bushing 36, and has the other end (an upper end) which is also retatably supported on the shaft member 12 through the intermediary of the ball bearing 34. A yoke 42 is mounted on the inner circumferential area of the rotor 30, and a cylindrical rotor magnet 44 is fixed in the inner circumferential area of the yoke 42. A stator 45 which faces the rotor magnet 44 is provided. This stator 45 includes a stator core 38 secured onto the shaft member 12, and a stator coil 40 wound in a desired manner around the stator core 38.

On the outside of the ball bearing 32, a magnetic fluid seal means 46 is provided. The magnetic fluid seal means 46 includes conductive pole pieces 48, 50 and an annular permanent magnetic member 52 which is placed between the pole pieces 48 and 50, and is retained by an annular holder 54 with an adhesive. On the upper side (as viewed in FIG. 1) of the outer ring of the ball bearing 32, the annular holder 54 is secured in the upper side (as viewed in FIG. 1) of the inner circumferential area of the rotor 30 with an adhesive which is applied in-between the rotor 30 and the annular holder 54. Between the pole pieces 48, 50, and the shaft member 12, conductive magnetic fluids 58 and 60 are magnetically retained.

Recording disks 62 such as magnetic disks are stacked up through the intermediary of spacers 66 on a flange 14 which annularly extends on the bottom end, as viewed in FIG. 1, of the outer circumferential area of the rotor 30. As viewed in FIG. 1, the uppermost recording disk 62 is pressed downwardly by means of an annular metal-clamp member 68 which is mounted by screws onto the upper portion of the rotor 30 to secure the recording disks 62.

The clamp member 68 extends in the direction towards the radial center or an axis of the shaft member 12 to enable press contact with the upper surface, as viewed in FIG. 1, of the pole piece 48 of the magnetic fluid seal means 46, and extends close enough to the shaft member 12 to cover the fluid seal means 46. In the clamp member 68, a protruding portion 68a which protrudes towards the magnetic fluid seal means 46 is provided to hold the upper surface (as viewed in FIG. 1) of the pole piece 48 by pressure contact.

In this embodiment, because the protruding portion 68a of the clamp member 68 holds the upper surface, as viewed in FIG. 1, of the pole piece 48 by pressure contact, static electricity generated on the recording disks 62 can be completely released to the outside of the device through the rotor 30, the clamp member 68, pole piece 48, the conductive magnetic fluid 58, and the shaft member 12.

Figure 3:
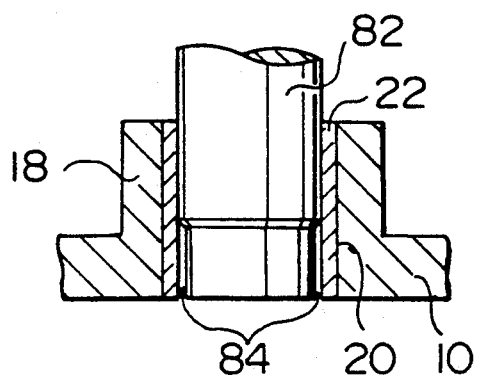
FIG. 3 is a partially enlarged section view illustrating a modification of the motor shown in FIG. 1.

FIG. 3 illustrates a modification of the shaft member. In FIG. 3, a diameter of an end portion of the shaft member 82 (from the bottom of the shaft member 12 as viewed in FIG. 3, a portion of approximately one third, in an axial direction, of the sleeve 22 wherein the shaft member 12 is press fitted) is designed to be somewhat smaller than an inner diameter of the sleeve 22 so as to provide a slight clearance between the sleeve 22 and the protruding portion of the housing 10, which facilitates the press fitting of the shaft member 82 into the sleeve 22.

The Second Embodiment

Figure 4:
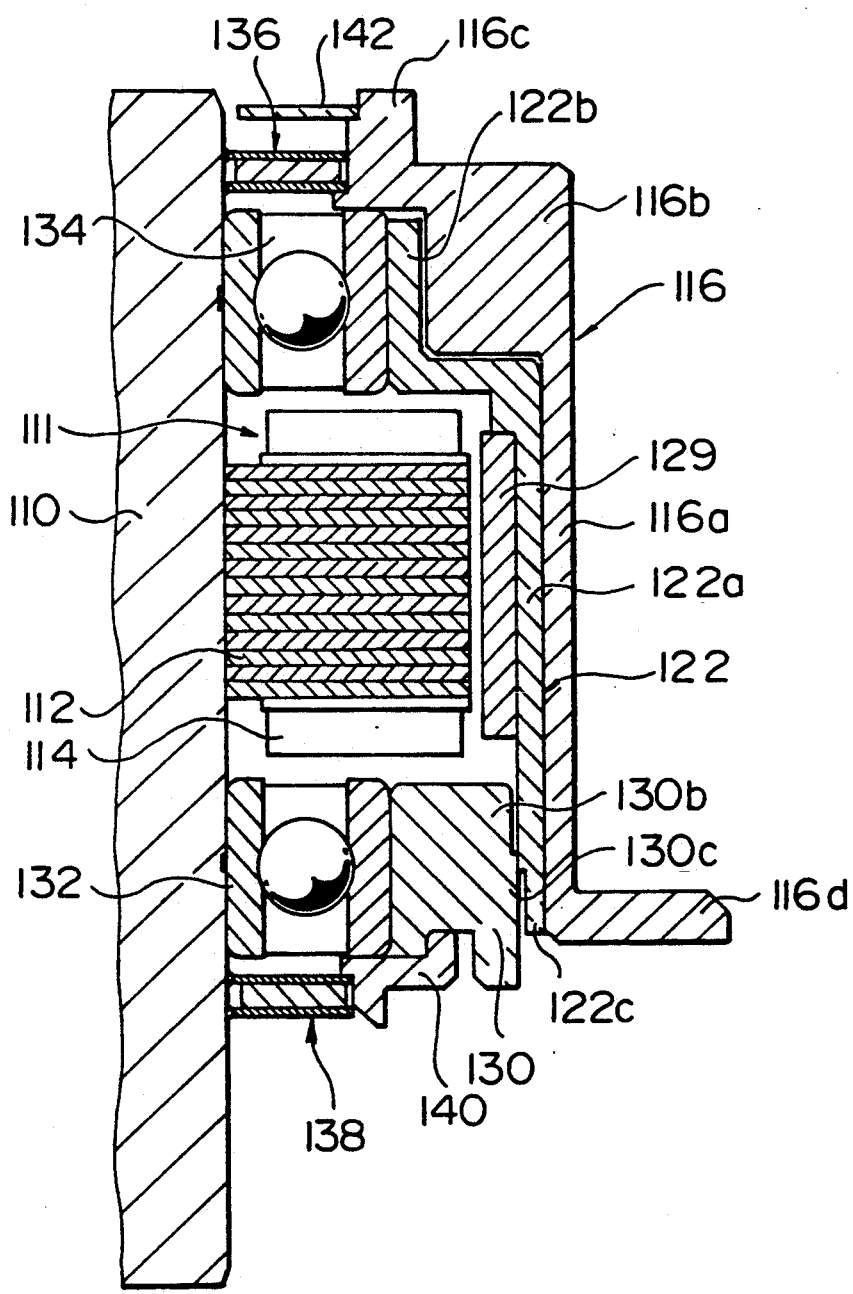
FIG. 4 is a section view illustrating an essential part of the second embodiment of the motor according to the present invention.

FIG. 4 illustrates the second embodiment of the spindle motor as one example of a motor according to the present invention.

A spindle motor shown in FIG. 4 comprises a shaft member 110 and a rotor 116 (which functions as a hub) relatively rotatable toward the shaft member 110 which is mounted on a frame (not shown in FIGS.) of a disk driving device.

The rotor 116 is made of aluminum or an aluminum alloy. The rotor 116 includes a larger diameter portion 116a whereon recording disks, such as magnetic disks, are to be mounted; a shoulder part 116b provided at the upper end portion (as viewed in FIG. 4) of the larger diameter portion 116a; a smaller diameter portion 116c located in the upper portion (as viewed in FIG. 4) of the shoulder part 116b; and a flange 116d circumferentially extended to the outer side from the bottom portion (as viewed in FIG. 4) of the larger diameter portion 116a. At the shoulder portion 116a, an inner diameter of the larger diameter portion 116a is reduced to an extent of the inner diameter in-between the larger diameter portion 116a and the smaller diameter portion 116c.

In the inner circumferential area of the rotor 116, a annular yoke 122 is provided. The yoke 122 includes a cylindrical large-diameter portion 122a and a reduced diameter portion 122b provided at an upper end (as viewed in FIG. 4) of the large-diameter portion 122a. The upper reduced-portion 122b is located in the inner side of the shoulder part 116b of the rotor 116 with a slight clearance. In the middle part of an inner circumferential surface of the yoke 122, an annular rotor magnet 129 is fixed. Confronting with the rotor magnet 129, a stator 111 is provided. The stator 111 includes a stator core 112 secured to the shaft member 110 and a stator coil 114 wound around the stator core 112. The rotor 116 is rotatably supported on the shaft member 110 through a pair of bearing members 132 and 134. In an embodiment, the one bearing member 134 is located at the upper (as viewed in FIG. 4) portion of the rotor 116 wherein an inner ring of the bearing member 134 is secured to the shaft member 110 and an outer ring of which supports the upper (as viewed in FIG. 4) reduced-portion 122b of the yoke 122. On the other hand, the other bearing member 132 is located at the lower (as viewed in FIG. 4) portion of the rotor 116 wherein an inner ring is secured to the shaft member 110 and an outer ring of which supports an free end of the large-diameter portion 122a of the yoke 122 through the below described bushing 130. On the outer side of a pair of the bearings 132 and 134, respectively are provided a magnetic fluid seal means 136 and 138. The one magnetic fluid seal means 136 is located in the outside of the bearing member 134 and is mounted on the inner circumferential surface of the smaller diameter portion 116c of the rotor 116. On the other hand, the other magnetic fluid seal means 138 is located in the outside of the bearing member 132 and is fixed on a inner circumferential surface of a holder 140 mounted on the lower side, as viewed in FIG. 4, (or outside along an axis of the shaft member 110) of the bushing 130. In addition, a cap member 142 is provided at the smaller diameter portion 116c of the rotor 116 (outside of the magnetic fluid seal means 136) to protect the magnetic fluid seal means 136.

The following is a description about an association manner of the rotor 116, the yoke 122, and the bushing 130. The rotor 116 is made of aluminum or an aluminum alloy and the yoke 122 is made of iron-type materials such as iron. As shown in FIG. 4, the association of the larger diameter portion 116a and the large-diameter portion 122a is done by secure shrinkage fit applied along the substantially overall span of the axial direction of the shaft member 110 (vertical direction as viewed in FIG. 4).

The bushing 130 is made of the same iron-type materials as that of the yoke 122, and the length of the bushing 130 in the axial direction of the shaft member 110 is substantially the same as that of the outer ring of the bearing member 132 onto which an inner circumferential surface of the bushing 130 is secured by press fit applied onto substantially overall inner surface.

An outer circumferential surface of the bushing 130 and an inner circumferential surface of the yoke 122 is secured by the following manner. At the free end portion (bottom end portion as viewed in FIG. 4) of the large-diameter portion 122a of the yoke 122, a larger inner-diameter portion 122c which has a somewhat larger inner-diameter than other inner diameter of the yoke 122 is provided. About an axially middle portion (vertical direction as viewed in FIG. 4) of the outer circumferential surface of the bushing 130, a recess is provided, and the outer diameter of the recess which is located in the upper portion 130b of the bushing 130 as viewed in FIG. 4 is designed to be slightly smaller than an outer diameter of the lower portion 130c of the bushing 130 as viewed in FIG. 4. When the association of the bushing 130 and the yoke 122 is achieved the desired manner of the above described configuration, the axial middle portion of the bushing 130 and the inner circumferential surface of the yoke 122 are secured. The contacting area of the secured bushing 130 and yoke 122 becomes rather narrower in the axial direction (2 to 5 mm is sufficient), and a slight clearance is produced at both ends of the bushing 130 between the bushing 130 and the yoke 122.

The above mentioned clearance at both ends of the bushing 130 will generate the following advantages: Even if there is a difference in thermal expansion between the yoke 122 and the bushing 130 caused by a variation of ambient temperature, the difference of these will mostly be absorbed by the above mentioned clearance, which will result in effectively preventing an eccentricity in the rotation center of the rotor 116. In addition, even if a variation of the ambient temperature causes a slight deformation of the yoke 116 (this deformation may be caused by a difference in thermal expansion between the rotor 116 and the yoke 122), the clearance will prevent both the ends of the bushing 130 from being affected by the deformation of the yoke 122 and also from a bad influence caused by a strain of the yoke 122.

To secure more completely the yoke 122 and the bushing 130 together, it is preferably recommended to provide an adhesive layer in the clearance between the yoke 122 and the bushing 130. When the adhesive layer is provided thereon, the elastic deformation of the adhesive layer performs to absorb the difference of the thermal expansions of the yoke 122 and the bushing 130.

In an embodiment of the invention, the adhesive is applied to both the outer circumferential surface of the bushing 130 and the inner circumferential surface of a free end portion of the large-diameter portion 122a of the yoke 122, then, while the adhesive is being applied thereon, the bushing 130 is press fitted into the yoke 122. As is easily understood from FIG. 4, not only because the outer diameter of the inserting end of the bushing 130 is slightly smaller than that of the other end of the bushing 130, but because the inner diameter of the larger inner-diameter portion 122c of the bushing 130 is slightly larger than that of the other portion of the large-diameter portion 122a, when press fitting is achieved, the adhesive will not be completely removed from the surfaces of both the yoke 122 and the bushing 130, and a sufficient adhesive is retained in the clearance of the yoke 122 and the bushing 130, thus enabling the complete securing of these together.

In the second embodiment of the invention, for instance, the bearing member 134 supports the rotor 116 through the intermediary of the yoke 122; however, the bearing member 134 can directly support the rotor 116.

Also in the second embodiment of the invention, for instance, either member out of a pair of the bearing members 132 and 134 supports the rotor 116 through the intermediary of the bushing 130; however, the other counterpart member of the bearing members 132 and 134 could support the rotor 116 through the intermediary of a bushing to which the decribed structural features of the present invention could also apply.

Furthermore, in the second embodiment, for instance, the recesses are provided at both the outer circumferential surface of the bushing 130 and the inner circumferential surface of the yoke 122 respectively, then the middle part of the bushing 130 is press-fitted into the yoke 122. However, without being restricted by this structural features of the present invention, annular protrusions could be provided at the outer circumferential surface of the bushing 130 or the inner circumferential surface of the yoke 122 to enable secure press fitting.

The Third Embodiment

Figure 5:
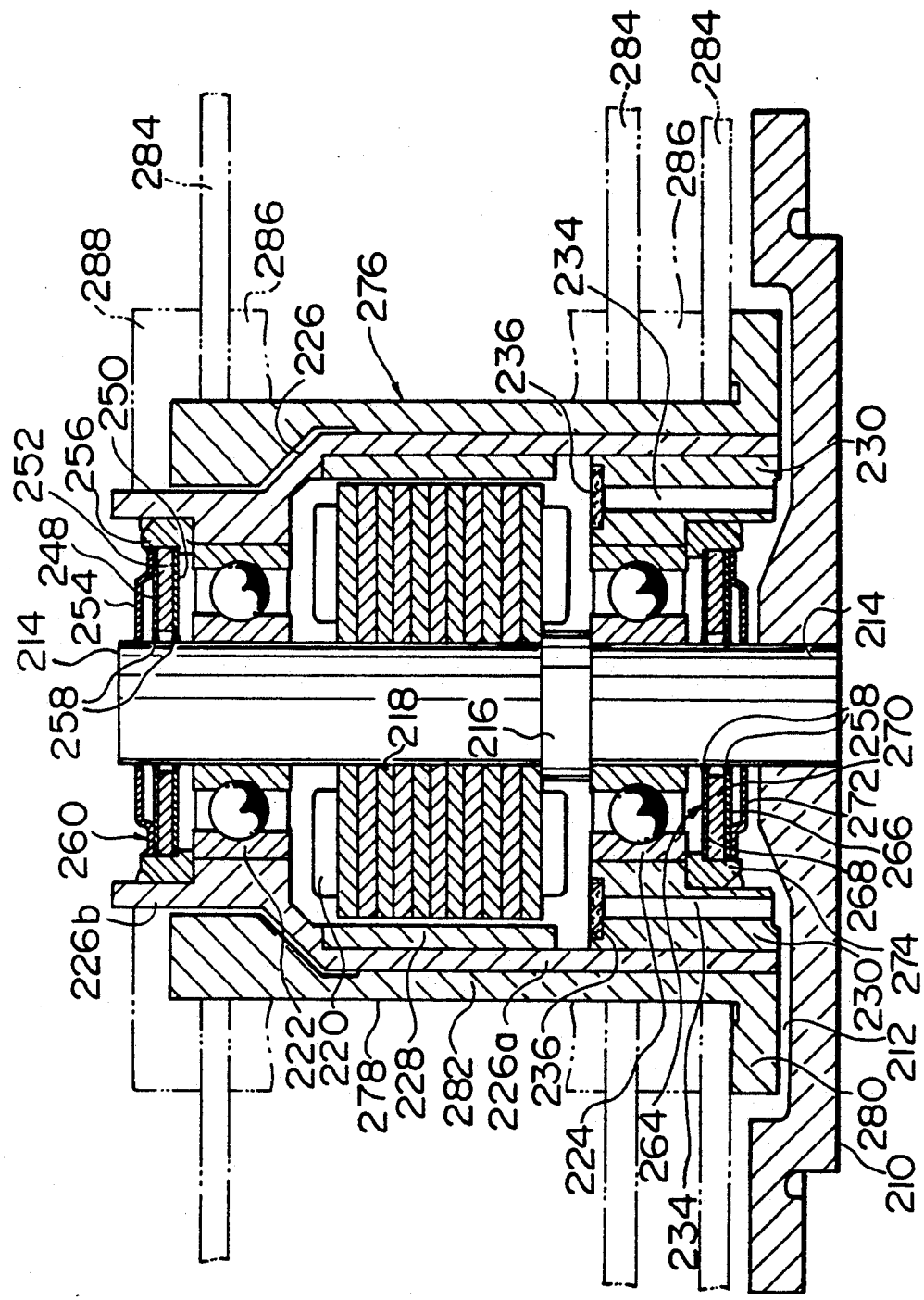
FIG. 5 is a section view illustrating the third embodiment of the motor according to the present invention.

FIG. 5 illustrates the third embodiment of the spindle motor as one example of a motor according to the present invention.

A spindle motor shown in FIG. 5 has a housing 210 which is mounted on a flame (not shown in FIGS.) of a disk driving device. In the inner portion of the housing 210, a circular convex portion 212 which has a swollen center portion is provided. Then, a shaft member 214 made of a ferromagnetic material is fixed in the swollen center with standing upright as viewed in FIG. 5.

In the middle part of the shaft member 214, a annular protrusion part 216 is provided and a stator core 218 is fixed on the upper side (as viewed in FIG. 5) of the annular protrusion part 216. A stator coil is wound around the stator core 218. A rotor 178 is rotatably supported on the shaft member 214 through bearing members 222 and 224. In an inner circumferential surface of the rotor 278, a yoke 226 made of ferromagnetic materials is provided. The yoke 226 forms a cylindrical shape of which a diameter of an upper portion (as viewed in FIG. 5) is reduced. A cylindrical rotor magnet 228 is mounted on an upper portion (as viewed in FIG. 5) of an inner circumferential surface of a large-diameter diameter potion 226a, of which a diameter is not reduced, of the yoke 226. A lower end portion (as viewed in FIG. 5) of the large-diameter potion 226a of the yoke 226 is supported by the bearing member 224 through an annular bushing 230 and a small-diameter portion 226b having the reduced diameter of the yoke 226 is supported by the bearing member 222. Thus, the yoke 226 is rotatably supported about the shaft member 214. And the rotor magnet 228 faces the stator core 218 with a clearance along an axial direction of the shaft member 214. At least one through hole 234 is provided on the bushing 130 in the axial direction (vertical direction as viewed in FIG. 5) of the shaft member 214. In an embodiment of the invention, a pair of through holes 234 is formed facing with each other about an axis of a rotation center of the bushing 130 to provide the bushing with a well-balancing rotation. More than two through holes 234 can be provided on the bushing 130 with substantially regular intervals in a circumferential direction. Each through holes 234 has a filter means 236 (on an upper end surface as viewed in FIG. 5). In an embodiment of the invention, a concave part is provided at each inner end portion (each upper end as viewed in FIG. 5) of the respective through holes 234. The cylindrical filter means 236 is fixed on each concave part. The filter means 236 is made of a materials which only permeate substantially a gas or a vapor. As an example, such materials could be represented as GORE-TEX (a registered Trademark; and made of a resin film of polytetrafluoroethylene-type having extremely minute pores) and other materials.

On the outside of the bearing members 222 and 224, respectively are provided a magnetic fluid seal means 260 and 264. The magnetic fluid seal means 260 includes pole pieces 248 and 250, and an annular permanent magnetic member 252 placed between the pole pieces 248 and 250. An annular covering member 254 covers the magnetic fluid seal means 260. An outer circumferential portion of the covering member 254 is mounted on an upper side surface (as viewed in FIG. 5) of the upper pole piece 248, and an inner circumferential portion is raised from the upper surface of the pole piece 248 and extends to a direction more closer to the shaft member 214 than an inner circumferential edge of the pole pieces 248 and 250. The pole pieces 248 and 250, the annular permanent magnetic member 252, and the covering materials 254 is secured on an inner circumferential surface of an annular holder 256. The annular holder 256 is fixed on the upper side (as viewed in FIG. 4) of the bearing member 222 in an inner circumferential surface a small-diameter portion 226b of the rotor yoke 226 and a magnetic fluid 258 is provided between the each pole piece 248, 250 and the shaft member 214.

The other magnetic fluid seal means 264 has substantially the same configuration as the above described magnetic fluid seal means 260 and includes pole pieces 266, 268, and an annular permanent magnetic member 270. A covering member 272 covers the magnetic fluid seal means 264 and is secured on an annular holder 274 which is fixed on the lower side (as viewed in FIG. 5) in an inner circumferential surface of the bushing 230. The other magnetic fluid 258 is provided between the each pole piece 266, 268 and the shaft member 214.

In a boundary area of an inside and outside of the spindle motor which includes the bearing members 222, 224, a stator core 218, a stator coil 220, and a rotor magnet 228, a gap between a rotation part 276 and the shaft member 214 are sealed by means of the magnetic fluid seal means 260 and 264.

The aluminum rotor 278 forms a generally cylindrical shape and has a flange 280 at the lower end as viewed in FIG. 5. Then, a recording disk 284 is set on a flange 280 of the rotor 278, where another recording disks 284 are stacked up alternately with the intermediary of spacers 286, and the recording disks 284 are secured between a clamping member 288 fixed on the upper end (as viewed in FIG. 5) of the rotor 278 and the above described flange 280.

In the boundary area of the interior part of the spindle motor, which includes the bearing members 222, 224, and others, and the exterior part of the motor, a gap between the rotation area and the shaft member 214 is sealed by the magnetic fluid. Even if there is a difference in pressure between the interior and exterior area, caused by a variation of temperature or atmospheric pressure, air or gas can go in and out via through holes 234, thus enabling the pressure difference to be canceled and preventing the magnetic fluid 258 in the magnetic fluid seal means 260 and 264 from being dispersed by the pressure difference.

Furthermore, only air or gas can permeate through the filter means 236, which prevents lubricant particles filled in the interior area of the spindle motor from being scattered to the exterior part of the motor.

In the above examples are described several preferred embodiments of the motor according to the present invention. However, it is to be recognized that the invention is not intended to be limited to the specific embodiments, but diverse modifications and variations may be made by those skilled in the art without departing from the scope of the present invention.

What is claimed is:

1. A motor comprising a shaft member; a rotor rotatably mounted on said shaft member through the intermediary of a pair of bearing means; a yoke mounted on an inner circumferential surface of said rotor; a rotor magnet fixed on a inner circumferential surface of said yoke; a stator facing said rotor magnet; a bushing placed between one part of the pair of said bearing means and said yoke, one end portion of said bushing having a somewhat larger outer diameter than that of the other end portion of said bushing; one end portion of said yoke having a somewhat larger inner diameter than that of a middle portion of said yoke, whereby said one end portion of said bushing and said middle portion of said yoke are secured together.

2. A motor as defined in claim 1 wherein said one end portion of said bushing and said middle portion of said yoke are secured together in press fit relationship.

3. A motor as defined in claim 2 wherein both end portions of said bushing and said yoke are secured together by means of an adhesive.

4. A motor as defined in claim 1 wherein the other part of the pair of said bearing means rotatably supports said rotor through said yoke.

5. A motor as defined in claim 1 wherein said rotor functions as a hub whereon recording disks are mounted.

6. A motor as defined in claim 1 wherein said rotor functions as a hub whereon recording members are mounted.

7. A motor as defined in claim 1, wherein a plurality of through holes which enable communication between the interior and exterior areas of said motor are provided on said bushing at substantially regular intervals in a circumferential direction.

8. A motor as defined in claim 7 wherein two of said through holes are provided facing with each other about an axis of a rotation center of said bushing.

9. A motor as defined in claim 7 wherein filter means are provided for each of said through holes.

* * * * *

UNITED STATES PATENT AND TRADEMARK OFFICE
CERTIFICATE OF CORRECTION

PATENT NO. : 5,325,004
DATED : June 28, 1994
INVENTOR(S) : Yokoyama et al.

It is certified that error appears in the above-indentified patent and that said Letters Patent is hereby corrected as shown below:

On the title page, under item [19], delete "Mori" and insert --Yokoyama-- and item [75], delete "Yoichi Mori" and "Hiroyuki Yonei".

Signed and Sealed this

Twenty-fifth Day of October, 1994

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : 5,325,004
DATED : June 28, 1994
INVENTOR(S) : Yokoyama et al

It is certified that error appears in the above-indentified patent and that said Letters Patent is hereby corrected as shown below:

On the title page: Item [75] Inventors: delete "Yoichi Mori" and --Hiroyuki Yonei".

Item [73] Assignee: delete "Nippon Densen Corporation" and substitute --Nippon Densan Corporation --.

Signed and Sealed this

Twenty-fifth Day of April, 1995

Attest:

BRUCE LEHMAN

*Attesting Officer*    *Commissioner of Patents and Trademarks*